(12) United States Patent  (10) Patent No.: US 9,274,664 B2
Ootani                      (45) Date of Patent:     Mar. 1, 2016

(54) DISPLAY DEVICE WITH TOUCH PANEL (71) Applicant: Japan Display Inc., Tokyo (JP)

(72) Inventor: Tomohiko Ootani, Tokyo (JP)

(73) Assignee: Japan Display Inc., Tokyo (JP)

( * ) Notice: Subject to any disclaimer, the term of this patent is extended or adjusted under 35 U.S.C. 154(b) by 59 days.

(21) Appl. No.: 14/314,321

(22) Filed: Jun. 25, 2014

(65) Prior Publication Data

US 2014/0375605 A1  Dec. 25, 2014

(30) Foreign Application Priority Data

Jun. 25, 2013  (JP) ................................. 2013-133226

(51) Int. Cl.
G06F 3/045 (2006.01)
G06F 3/044 (2006.01)
G06F 3/041 (2006.01)

(52) U.S. Cl.
CPC .............. G06F 3/044 (2013.01); G06F 3/0412 (2013.01)

(58) Field of Classification Search
CPC ....... G06F 3/041; G06F 3/0412; G06F 3/044; G09G 3/3648; G02F 1/13338; G02F 1/134363; G02F 2001/134372; G02F 2201/12
See application file for complete search history.

(56) References Cited

U.S. PATENT DOCUMENTS

| 8,519,978 | B2* | 8/2013 | Konicek ................ G06F 3/0412 345/104 |
| 2007/0091013 | A1* | 4/2007 | Pak ....................... G02F 1/13338 345/50 |
| 2008/0158183 | A1* | 7/2008 | Hotelling .............. G06F 3/0416 345/173 |
| 2010/0007628 | A1* | 1/2010 | Eriguchi ................. G06F 3/045 345/174 |
| 2010/0182273 | A1 | 7/2010 | Noguchi et al. |
| 2010/0194697 | A1* | 8/2010 | Hotelling .............. G06F 3/0412 345/173 |
| 2010/0225609 | A1* | 9/2010 | Huang ................ G02F 1/13338 345/173 |
| 2012/0075237 | A1* | 3/2012 | Ikeda ...................... G06F 3/044 345/174 |
| 2012/0105370 | A1* | 5/2012 | Moore .................. G06F 3/0412 345/174 |
| 2013/0201146 | A1* | 8/2013 | Cronin .................. G06F 3/0412 345/174 |

FOREIGN PATENT DOCUMENTS

JP  2009-244958 A  10/2009

* cited by examiner

*Primary Examiner* — Joe H Cheng
(74) *Attorney, Agent, or Firm* — Typha IP LLC (57) ABSTRACT

A display device with touch panel includes a display panel having a display area in which pixels are arranged in a matrix form and displaying an image by outputting lights corresponding to gray levels with respect to each pixel, and a touch panel electrode as one electrode of a set of electrodes forming capacitance for sensing contact in an area superimposed on the display area, extending in one direction, including a plurality of linear transparent conducting materials arranged in parallel, and having a periodically changing line width.

9 Claims, 8 Drawing Sheets

FIG.8

DISPLAY DEVICE WITH TOUCH PANEL

CROSS-REFERENCE TO RELATED APPLICATION

The present application claims priority from Japanese application JP2013-133226 filed on Jun. 25, 2013, the content of which is hereby incorporated by reference into this application.

BACKGROUND OF THE INVENTION

1. Field of the Invention

This invention relates to a display device with touch panel.

2. Description of the Related Art

Touch panels as input devices provided on display screens of information communication terminals including computers have been widely used.

The touch panels are input devices that allow processors to perform processing by recognizing coordinates on panels touched by users using fingers or the like. For the touch panels, a resistive-film system that detects changes in resistance of a touched part, an optical sensor system that detects changes in amounts of light of a part blocked by touch, a capacitance coupling system that detects changes in capacitance, etc. have been known. The capacitance coupling system has been widely used because of the higher transmittance of the panel without reduction in the display image quality, no contact with other electrodes and the higher durability, or the like.

Recently, in response to requests for downsizing and thinning with respect to information communication terminals, thinner liquid crystal display devices with touch panel have been demanded. JP 2009-244958 A has disclosed a thinner liquid crystal display device with touch panel by using common electrodes of the liquid crystal display device as drive electrodes of the touch panel in the IPS (In-Plane Switching) liquid crystal display device in which both pixel electrodes and the common electrodes are provided on a TFT (Thin Film Transistor) substrate.

SUMMARY OF THE INVENTION

In a capacitance touch panel of a display device with touch panel, a plurality of electrodes of a transparent conducting material such as ITO (Indium Tin Oxide) and extending in one direction in parallel on a display area for detection of a touch position are formed. The refractive index of light in the area with the electrodes formed therein is different from the refractive index in an area without the electrodes, and thus, the parts with the electrodes formed therein may be visually recognized as streaky patterns due to reflection of sunlight or the like, for example.

The invention has been achieved in view of the above described situations, and an object of the invention is to provide a display device with touch panel for an observer hard to recognize electrode shapes even when outside light is reflected by a touch panel surface.

A display device with touch panel of the invention is a display device with touch panel including a display panel having a display area in which pixels are arranged in a matrix form and displaying an image by outputting lights corresponding to gray levels with respect to each pixel, and a touch panel electrode as one electrode of a set of electrodes forming capacitance for sensing contact in an area superimposed on the display area, extending in one direction, including a plurality of linear transparent conducting materials arranged in parallel, and having a periodically changing line width. In the display device with touch panel of the invention, the line width periodically changes in a range from 10 to 30 μm.

Further, in the display device with touch panel of the invention, a shape of the touch panel electrode may be a beaded shape in which a plurality of circular shapes are provided with shifts of distances less than diameters of the circular shapes in the one direction.

Furthermore, in the display device with touch panel of the invention, an area in which the touch panel electrodes are arranged in parallel may have touch panel electrode areas in which the touch panel electrodes are arranged in parallel at equal intervals, and dummy electrode areas as areas spaced at larger intervals than the equal intervals between the electrode areas, extending in the one direction, and including dummy electrodes of a plurality of linear transparent conducting materials arranged in parallel, and the dummy electrodes may have the same shapes as those of the touch panel electrodes and are arranged in parallel at the equal intervals.

Further, in the display device with touch panel of the invention, the dummy electrodes may be electrically floating or grounded.

Furthermore, in the display device with touch panel of the invention, an arrangement pitch of the touch panel electrodes arranged in parallel may be from 30 to 50 μm.

Further, in the display device with touch panel of the invention, the pixels may be provided in gaps between the touch panel electrodes so that lights of blue pixels may be output in a plan view.

Furthermore, in the display device with touch panel of the invention, the touch panel electrodes may be drive electrodes to which drive pulse is applied and detection electrodes that form capacitance.

Further, in the display device with touch panel of the invention, the display device may be a liquid crystal display device that controls an amount of transmission light by controlling alignment of a liquid crystal composition using an electric field formed between pixel electrodes and a common electrode, and the common electrode may be divided into a plurality of parts and at least part thereof may be an other electrode of the set of electrodes forming the capacitance for sensing contact.

DETAILED DESCRIPTION OF THE INVENTION

As below, embodiments of the invention will be explained with reference to the drawings. Note that, in the drawings, the same or equal elements have the same signs and the duplicated explanation will be omitted.

Figure 1:
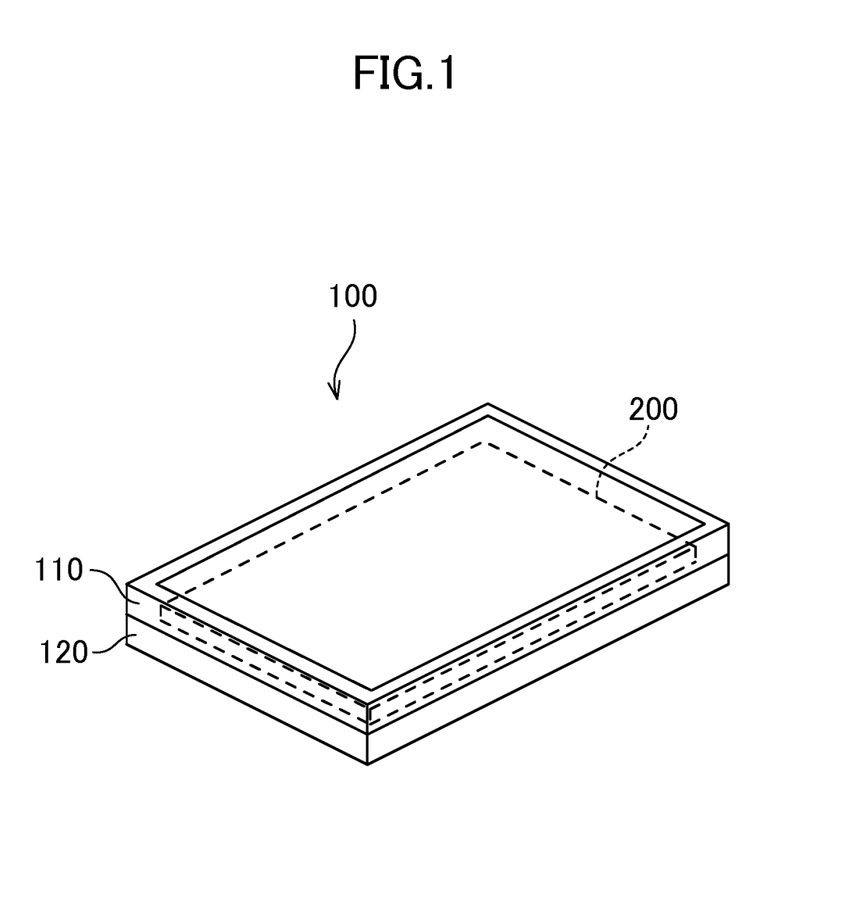
FIG. 1 shows a liquid crystal display device with touch panel according to one embodiment of the invention.

FIG. 1 shows a liquid crystal display device with touch panel 100 according to an embodiment of the invention. As shown in the drawing, the liquid crystal display device with touch panel 100 includes a liquid crystal display panel with touch panel 200, and an upper frame 101 and a lower frame 102 that secure to sandwich the liquid crystal display panel with touch panel 200.

Figure 2:
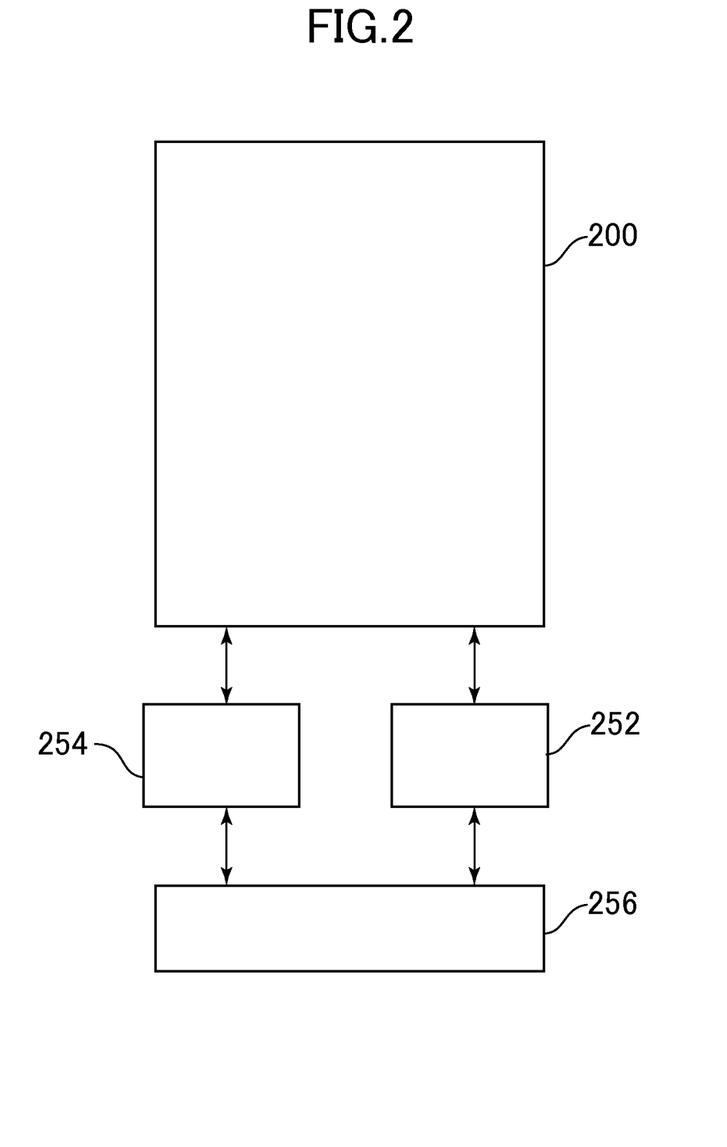
FIG. 2 is a block diagram showing a control configuration of a liquid crystal display panel with touch panel in FIG. 1.

FIG. 2 is a block diagram showing a control configuration of the liquid crystal display panel with touch panel 200 in FIG. 1. As shown in the drawing, the liquid crystal display panel with touch panel 200 is controlled by a display control unit 252 that controls a liquid crystal display function of performing screen display, a touch panel control unit 254 that controls a touch panel function of detecting a touch position on a screen, and a system control unit 256 that performs integrated control of the display control unit 252 and the touch panel control unit 254. The liquid crystal display device with touch panel 100 also has the display control unit 252, the touch panel control unit 254, and the system control unit 256 to control.

Figure 3:
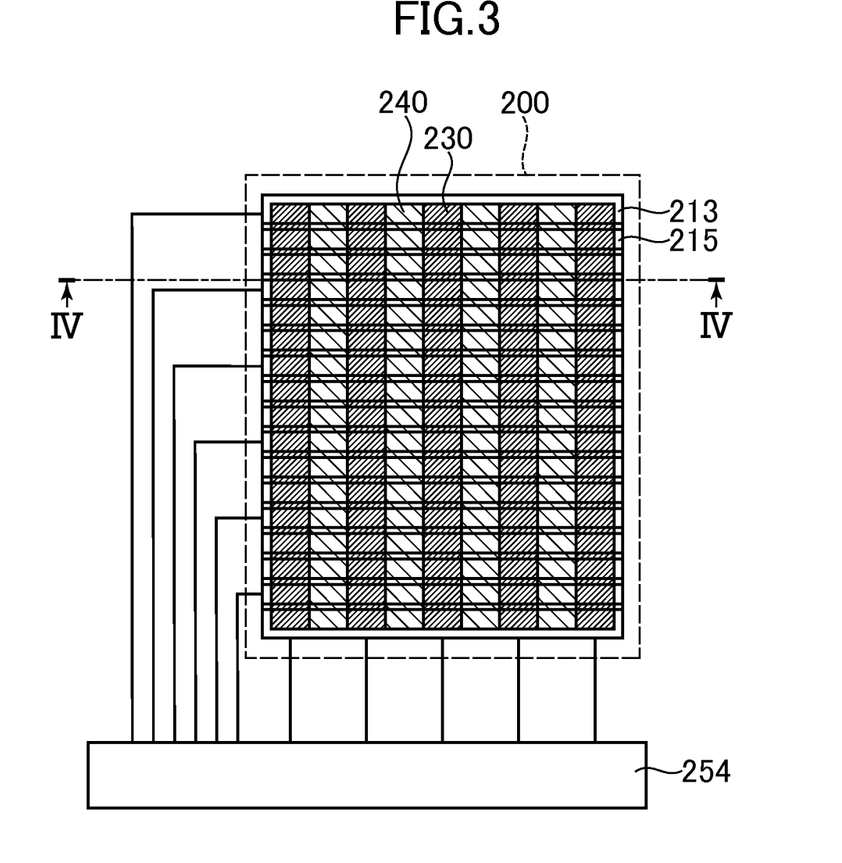
FIG. 3 shows an arrangement of electrodes controlled by a touch panel control unit in FIG. 2.

FIG. 3 shows an arrangement of electrodes controlled by the touch panel control unit 254 in FIG. 2. Common electrodes used for liquid crystal display include drive electrodes 213 having strip shapes extending along short sides of a display area, to which voltages are applied from the touch panel control unit 254, and non-drive electrodes 215 as other electrodes than the drive electrodes 213, having strip shapes extending along the short sides of the display area, and they are arranged to cover the display area.

On the other hand, in another layer than the layer with the common electrodes arranged therein, a plurality of detection areas 230 arranged in parallel along the short sides of the display area, in which a plurality of detection lines 231 to be described later extending along long sides of the display area are provided, and dummy areas 240 provided between the respective detection areas 230, in which dummy conductive lines 241 to be described later similar to the detection lines 231 are provided like the detection areas 230 are formed. Further, signals detected by the plurality of detection lines 231 are input to the touch panel control unit 254 with respect to each detection area 230. The dummy conductive lines 241 within the dummy areas 240 may be electrically floating or grounded. When the lines are floating, the lines have functions as auxiliary capacitance at touch detection. Note that, in the drawing, for explanation, the number of detection areas 230 etc. are omitted, however, it is desirable that the pitch of the arrangement of the detection areas 230 is about 5 mm, the width of the detection areas 230 is about 700 μm, and the dummy areas 240 are arranged to fill the spaces between the detection areas 230.

Figure 4:
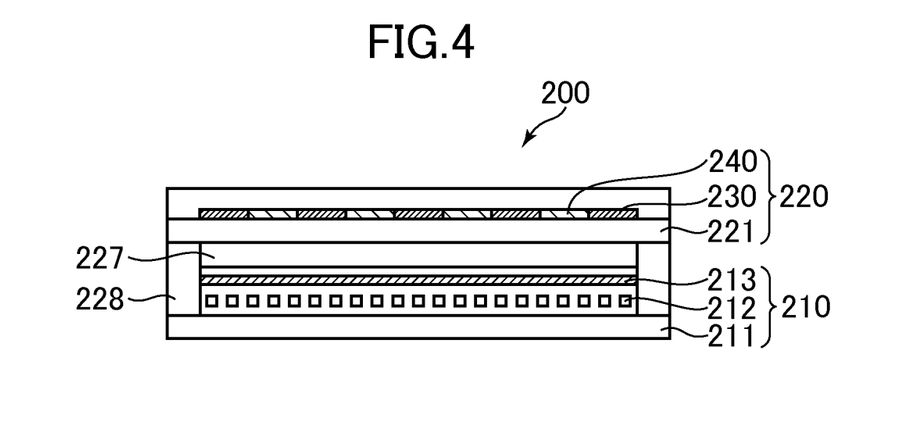
FIG. 4 is a sectional view along IV-IV line in FIG. 3.

FIG. 4 schematically shows a sectional view along IV-IV line of FIG. 3. As shown in the drawing, the liquid crystal display panel with touch panel 200 includes a TFT board 210 on which thin film transistors (TFTs) (not shown) are formed and circuits for controlling alignment of liquid crystal are formed with respect to each pixel, a color filter board 220 that outputs incident lights as lights having wavelengths of the respective RGB colors with respect to each pixel by color filters (not shown), and a liquid crystal layer 227 containing a liquid crystal composition sealed by a sealing agent 228 between the boards.

Here, in the TFT board 210, as shown in FIG. 4, the drive electrodes 213 and the non-drive electrodes 215 (see FIG. 3), which are functioning as the common electrodes, and the pixel electrodes 212 in liquid crystal display are formed on a glass substrate 211, and, in the color filter board 220, the detection areas 230 and the dummy areas 240 are formed on a glass substrate 221.

Figure 5:
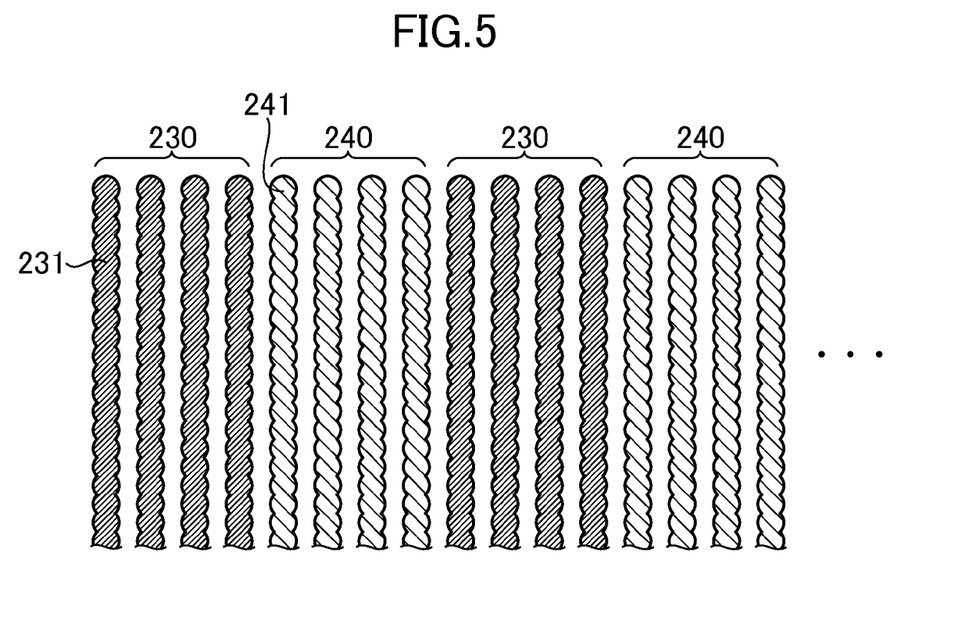
FIG. 5 is an enlarged view of detection areas and dummy areas alternately arranged on a color filter board.

FIG. 5 is an enlarged view of the detection areas 230 and the dummy areas 240 alternately arranged on the glass substrate 221 of the color filter board 220. As shown in the drawing, the detection areas 230 and the dummy areas 240 include the plurality of detection lines 231 and the plurality of dummy conductive lines 241, respectively. The respective detection lines 231 and dummy conductive lines 241 have beaded shapes in which a plurality of circular shapes are provided with shifts of distances less than their diameters, and thereby, the respective detection lines 231 and the respective dummy conductive lines 241 extend while periodically changing line widths. In the embodiment, the example in which the detection areas 230 each including the four detection lines 231 and the dummy areas 240 each including the four dummy conductive lines 241 are alternately arranged is shown, and intervals between the respective detection lines 231, intervals between the respective dummy conductive lines 241, and intervals between the detection areas 230 and the dummy areas 240 are equal. Note that the intervals between the respective detection lines 231, the intervals between the respective dummy conductive lines 241, and the intervals between the detection areas 230 and the dummy areas 240 may be arbitrarily determined, the intervals between the respective detection lines 231 and the intervals between the respective dummy conductive lines 241 may be different, and may be different from the intervals of the detection areas 230 and the dummy areas 240.

In the drawing, the shapes of the detection lines 231 and the dummy conductive lines 241 are the above described beaded shapes, however, may be shapes defined by curved lines, shapes defined by linear lines, or shapes using both of the lines as long as the shapes may have periodically changing line widths.

The shapes have periodically changing line widths, and thereby, even when the outside light is reflected by the touch panel surface, visual recognition of the electrode shapes of the detection lines 231 and the dummy conductive lines 241 may be made harder. Particularly, the line widths are periodically changed in the range from 10 to 30 μm, and thereby, the shapes are not substantially visually sensed by the observer. Here, it is desirable that the pitch of the arrangement of the detection lines 231 or the dummy conductive lines 241 is from 30 to 50 μm. Further, with the shapes, for example, it is not necessary to provide an optical sheet having a function of homogenizing the reflection light of the outside light or the like.

Figure 6:
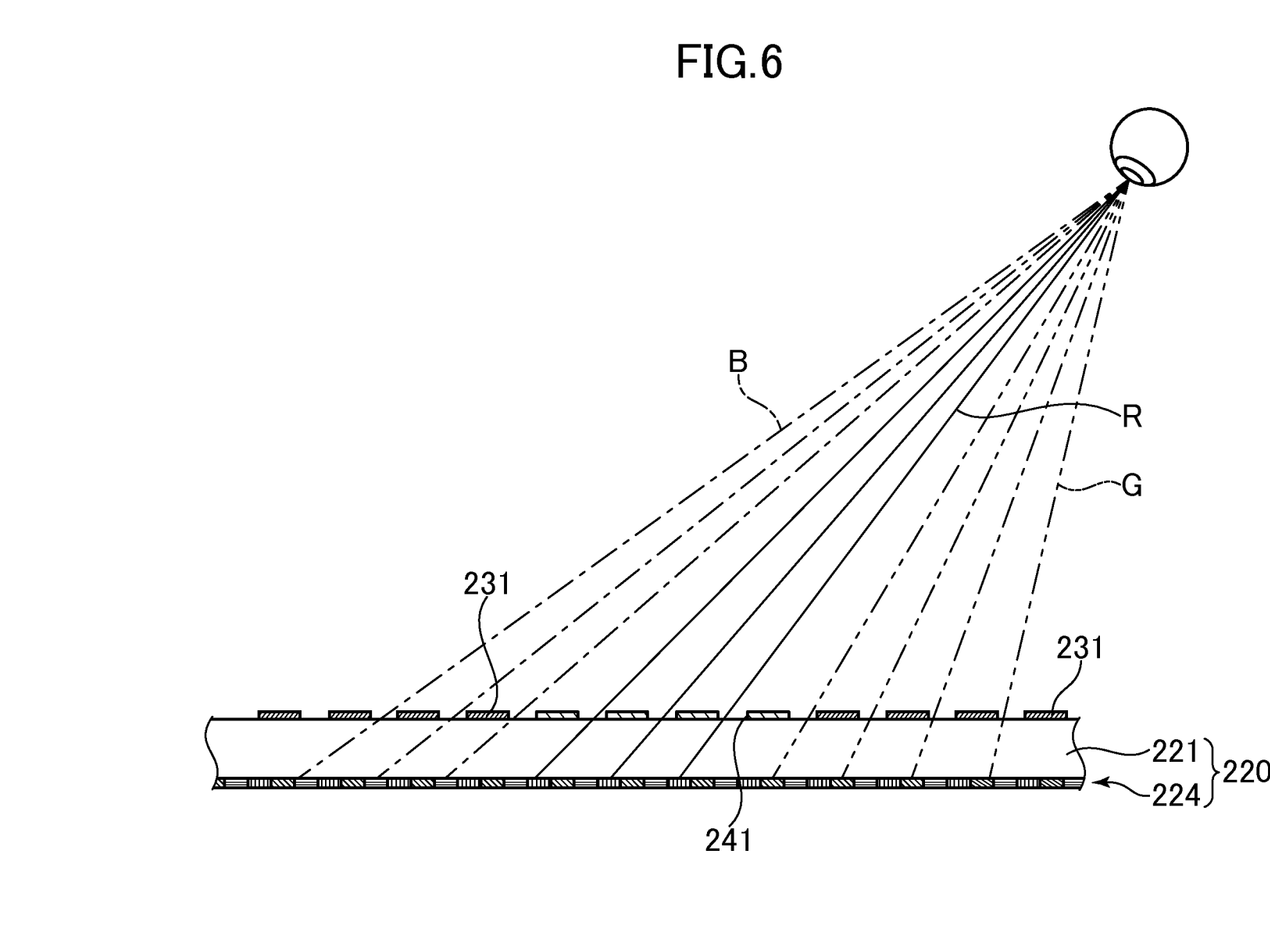
FIG. 6 is a sectional view for explanation of a cause of generation of interference fringes (moire) in the display device with touch panel.

FIG. 6 is a sectional view for explanation of a cause of generation of interference fringes (moire) in the display device with touch panel. In FIG. 6, for explanation, the detection lines 231 and the dummy conductive lines 241 formed on the glass substrate 221 of the color filter board 220 and a color filter layer 224 in which R (red) G (green) B (blue) color filters formed at the TFT board 210 side of the glass substrate 221 are arranged are shown. As shown in the drawing, in bright lights output through the gaps between the detection lines 231 and the dummy conductive lines 241, when the RGB lights periodically change while pluralities of them are respectively continuing, the difference between the period and the period of the RGB arrangement of the color filters is considered to be a cause of generation of interference fringes.

Figure 7:
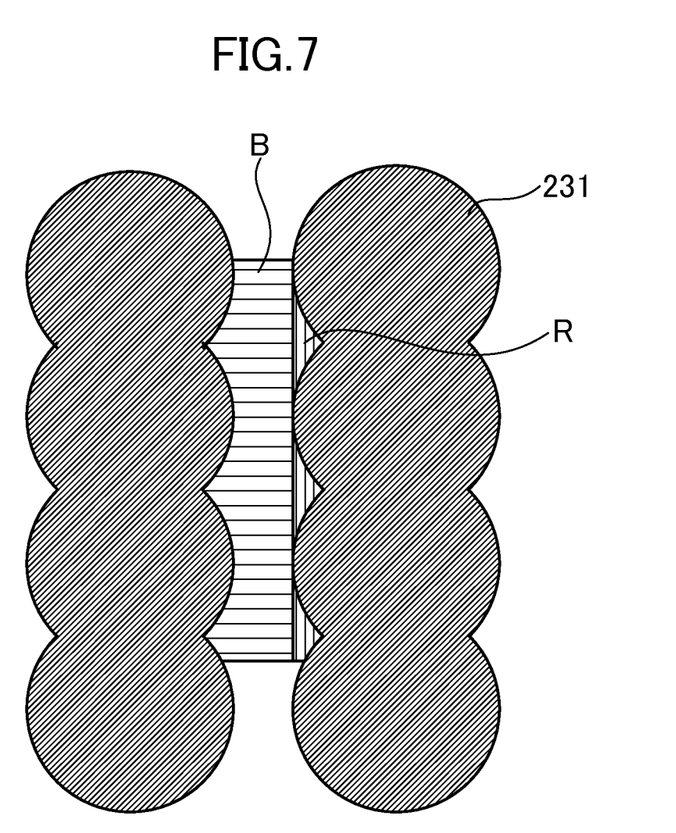
FIG. 7 is an enlarged view of two detection lines and color filters that output lights through a gap between the lines.

FIG. 7 is an enlarged view of the two detection lines 231 and the color filters that output lights through the gap between the lines. As shown in the drawing, the line widths of the detection lines 231 and the dummy conductive lines 241 periodically change and there are parts in which the lights output from the gap between the two detection lines 231 are lights, not monochromatic, but in a plurality of colors of B-color and R-color, for example, and thereby, generation of interference fringes may be prevented. Further, by the periodic changes of the line widths, the periodicity causing interference fringes is changed, and thereby, the generation of interference fringes may be prevented. Furthermore, the generation of interference fringes may be prevented, and thereby, for example, it is not necessary to provide an optical sheet having a function of making recognition of interference fringes harder or the like.

Note that the above described cause of interference fringes is just an example, and, even when there is another cause, the line widths of the detection lines 231 and the dummy conductive lines 241 are periodically changed, and thereby, in many cases where the periodicity causing interference fringes is hindered, the generation of interference fringes may be suppressed according to the embodiment.

Figure 8:
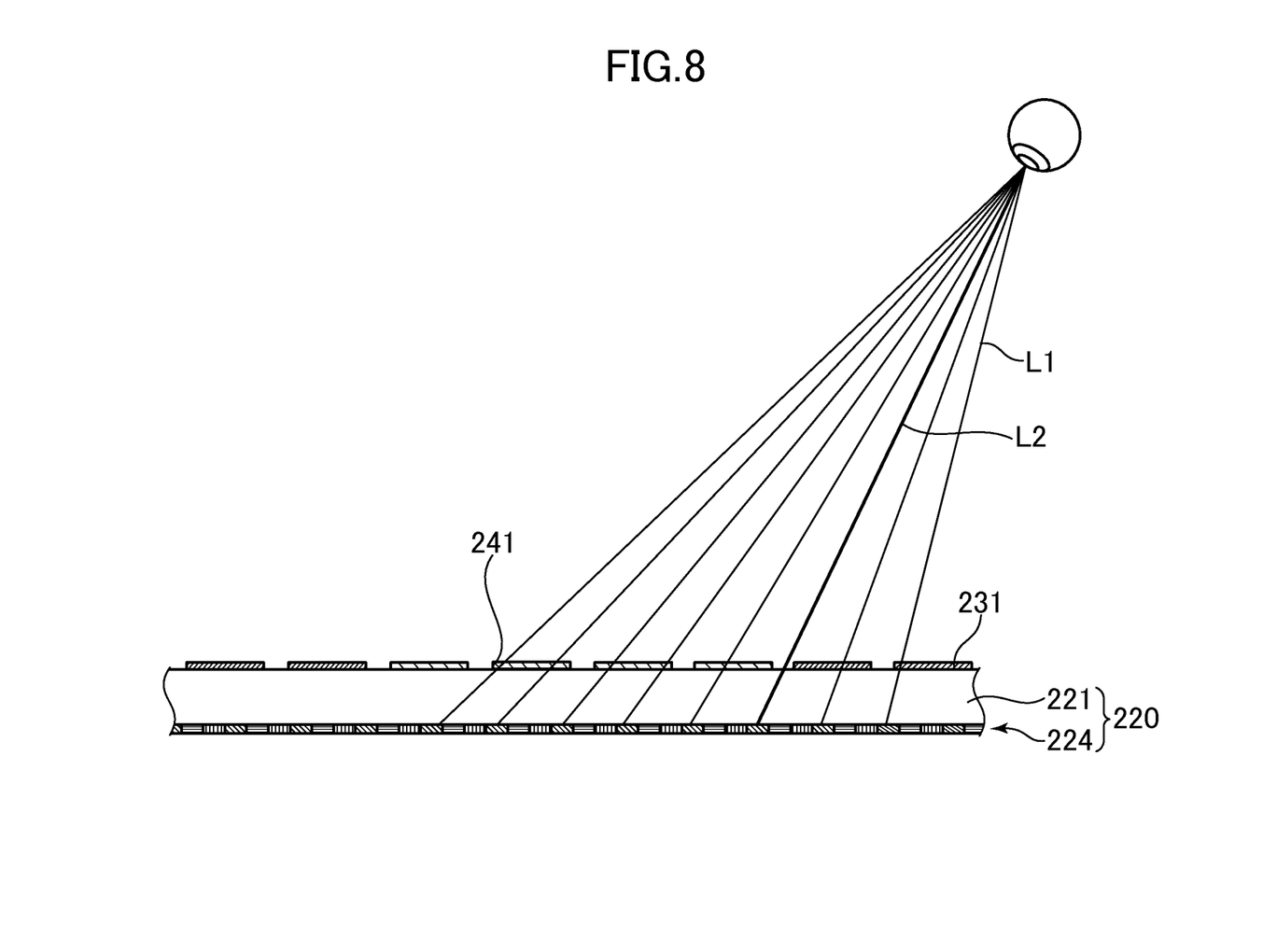
FIG. 8 is a sectional view for explanation of a cause of generation of streaky bright parts in the display device with touch panel.
Figure 9:
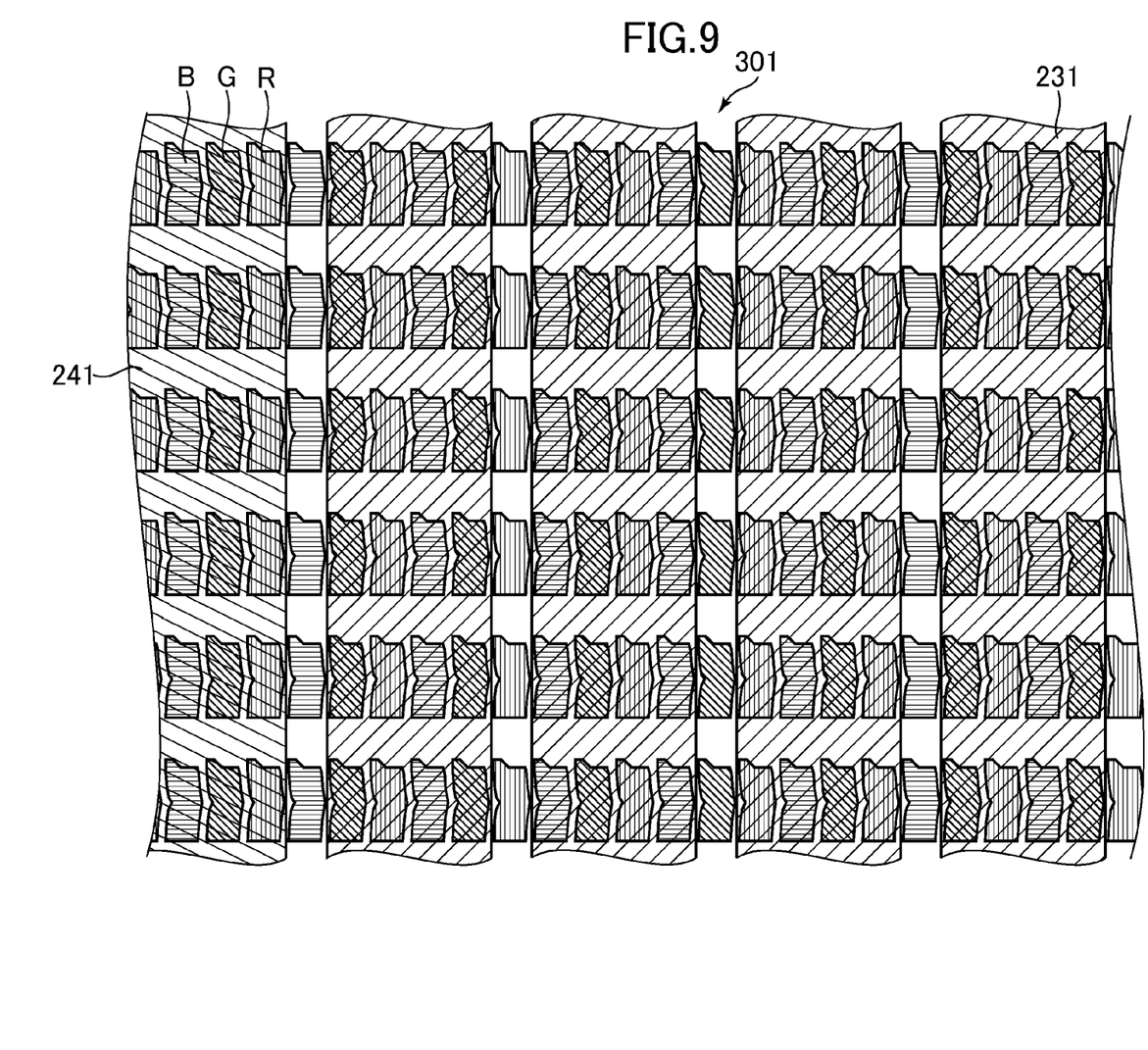
FIG. 9 is a plan view for explanation of the cause of generation of the streaky bright parts in the display device with touch panel.

FIGS. 8 and 9 are respectively a sectional view and a plan view for explanation of a cause of generation of streaky bright parts in the display device with touch panel. In FIG. 8, like in FIG. 6, the detection lines 231 and the dummy conductive lines 241 and the color filter layer 224 in which RGB color filters are arranged are shown. As shown in the drawing, for example, at monochromatic emission of G-color light, there are lights L1 visually sensed via the detection lines 231 and the dummy conductive lines 241 and lights L2 passing through the gaps between the detection lines 231 and the dummy conductive lines 241, and thereby, only the parts of the lights L2 are bright and highly visible. FIG. 9 shows the planar view of FIG. 8, and shows the cause of generation of streaky bright parts using shapes of detection lines of a display device with touch panel in related art. As shown in the drawing, at the monochromatic emission of G-color light, the G-color light from the gap 301 of the detection lines 231 is visually sensed particularly brightly, and recognized as a streaky brightness part compared to the other G-colors visually recognized via the detection lines 231 and the dummy conductive lines 241. Regarding the visual defect, in the embodiment, as shown in FIG. 7, the line widths of the detection lines 231 and the dummy conductive lines 241 periodically change, and there are parts in which the lights output from the gaps between the detection lines 231 and the dummy conductive lines 241 are lights, not monochromatic, but in a plurality of colors of B-color and R-color, for example. Accordingly, generation of those streaky bright parts may be suppressed. Further, thereby, for example, it is not necessary to provide an optical sheet having a function of making recognition of streaky bright parts harder or the like.

Note that, to suppress the generation of the streaky bright parts, in addition to the above described embodiment, the color of the pixels provided in the gaps between the detection lines 231 and the dummy conductive lines 241 may be set to a color with brightness relatively hard to be visually sensed. The color with brightness hard to be visually sensed is specifically B among RGB. The B-color pixels are provided in the gaps between the detection lines 231 and the dummy conductive lines 241 in the plan view, and thereby, the generation of the streaky bright parts may be further suppressed.

Note that, in the embodiment, the shapes having periodically changing line widths are applied to the detection electrodes at the side closer to the observer's side, however, the shapes may be applied to electrodes formed at the farther sides from the observer's side or may be applied to either of the detection electrodes or the drive electrodes.

Further, in the display device of the embodiment, the RGB pixels are provided, however, the display device may have pixels of different colors such as RGBW (white).

Furthermore, in the embodiment, the touch panel containing display device combined with the IPS liquid crystal display device is shown, however, the embodiment may be applied to a separate touch panel device for attachment to a display surface of a display device such as a liquid crystal display device or an organic EL display device, or may be applied to another touch panel containing display device.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device with touch panel comprising:
    a display panel having a display area in which pixels are arranged in a matrix form and displaying an image by outputting lights corresponding to gray levels with respect to each pixel; and
    a touch panel electrode as one electrode of a set of electrodes forming capacitance for sensing contact in an area superimposed on the display area, extending in one direction, including a plurality of linear transparent conducting materials arranged in parallel, and having a periodically changing line width.

2. The display device with touch panel according to claim 1, wherein the line width periodically changes in a range from 10 to 30 μm.

3. The display device with touch panel according to claim 1, wherein a shape of the touch panel electrode is a beaded shape in which a plurality of circular shapes are provided with shifts of distances less than diameters of the circular shapes in the one direction.

4. The display device with touch panel according to claim 1, wherein an area in which the touch panel electrodes are arranged in parallel has:
    touch panel electrode areas in which the touch panel electrodes are arranged in parallel at equal intervals; and
    dummy electrode areas as areas spaced at larger intervals than the equal intervals between the touch panel electrode areas, extending in the one direction, and including dummy electrodes of a plurality of linear transparent conducting materials arranged in parallel, and
    the dummy electrodes have the same shapes as those of the touch panel electrodes and are arranged in parallel at the equal intervals.

5. The display device with touch panel according to claim 4, wherein the dummy electrodes are electrically floating or grounded.

6. The display device with touch panel according to claim 1, wherein an arrangement pitch of the touch panel electrodes arranged in parallel is from 30 to 50 μm.

7. The display device with touch panel according to claim 1, wherein the pixels are provided in gaps between the touch panel electrodes so that lights of blue pixels may be output in a plan view.

8. The display device with touch panel according to claim 1, wherein the touch panel electrodes are drive electrodes to which drive pulse is applied and detection electrodes that form capacitance.

9. The display device with touch panel according to claim 1, wherein the display device is a liquid crystal display device that controls an amount of transmission light by controlling alignment of a liquid crystal composition using an electric field formed between pixel electrodes and a common electrode, and the common electrode is divided into a plurality of parts and at least part thereof is an other electrode of the set of electrodes forming the capacitance for sensing contact.

* * * * *